(No Model.)
J. RICHARDS.
RACK FOR GROWING PLANTS.
No. 417,838. Patented Dec. 24, 1889.
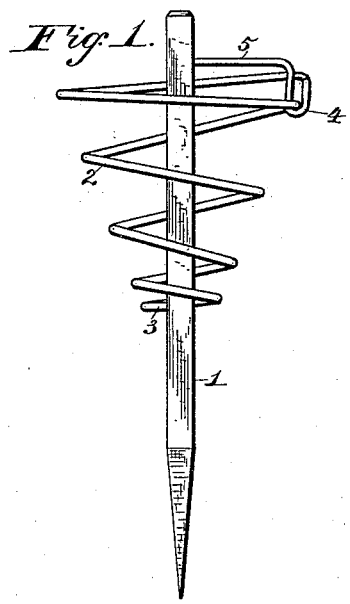
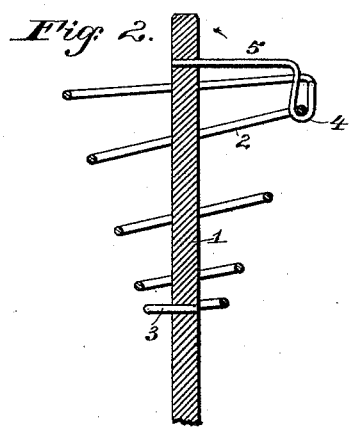
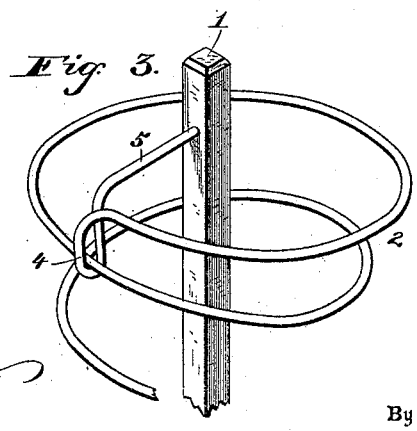
WITNESSES:
Percy C Bowen
Wm C Belt
INVENTOR
James Richards
By Edson Bros
Attorneys

UNITED STATES PATENT OFFICE.

JAMES RICHARDS, OF BUCKHANNON, ASSIGNOR OF ONE-HALF TO JOHN I. GASTON, OF ZINNIA, WEST VIRGINIA.

RACK FOR GROWING PLANTS.

SPECIFICATION forming part of Letters Patent No. 417,838, dated December 24, 1889.

Application filed August 19, 1889. Serial No. 321,281. (No model.)

*To all whom it may concern:*

Be it known that I, JAMES RICHARDS, a citizen of the United States, residing at Buckhannon, in the county of Upshur and State of West Virginia, have invented certain new and useful Improvements in Racks for Growing Plants; and I do hereby declare the following to be a full, clear, and exact description of the invention, such as will enable others skilled in the art to which it appertains to make and use the same.

My invention relates to an improved rack for growing plants or flowers; and it has for its object to provide a simple, inexpensive, and durable device which can be readily inserted into the ground alongside of the growing plant, and around which the plant can be trained so as to be supported by the rack.

With these and other ends in view my invention consists of a vertical central stake, a single coiled or spiral supporting-wire, a coil supporting-wire the ends of which are bent to form horizontal arms which serve to brace and strengthen the coils, the lower arm of said wire support being bent inwardly toward the center of said supports and inserted into one side of the stake, and the upper arm is first bent to form a vertical sustaining-loop which receives and supports the upper coil, and then bent inwardly toward the center of the coiled support, the upper arm being inserted or driven into the upper part of the central stake on the opposite side thereof from that on which the lower arm of the spiral or coiled wire support is inserted. By forming the spiral or coiled wire support with two horizontal arms which enter the central stake on opposite sides thereof, and providing the upper horizontal arm with a depending loop that receives the upper coil of the wire support, I am enabled to provide a rack which has sufficient strength and rigidity to enable it to support the plants when they are heavily laden with fruit or vegetables.

To enable others to more readily understand my invention, I will now proceed to a detailed description thereof in connection with the accompanying drawings, in which—

Figure 1 is a side elevation of my improved rack for growing plants, &c. Fig. 2 is a vertical central sectional view thereof. Fig. 3 is an enlarged detail view of the upper part of the coiled wire support.

Like numerals of reference denote corresponding parts in all the figures of the drawings, referring to which—

1 designates the central vertical stake, and 2 the coil or spiral wire support which encircles said stake and is secured at its ends thereto, the whole constituting a rack for supporting a growing plant or flower. This coiled support is formed from a single continuous piece of wire, and its coils gradually increase in diameter from the lower end thereof toward the upper end. The free end of the lower coil of said support is bent inwardly toward the center of the coil or spiral to form a lower horizontal arm 3, and the corresponding end of the upper coil of the support is bent to form a vertical sustaining-loop 4 and an upper horizontal arm 5. The end of the upper coil is first bent or turned downward and then upward to form the sustaining-loop 4, the lower side of which is closed and the upper side open, (see Fig. 3,) and the wire is then bent inward in a horizontal direction toward the center of the coiled support 2 to form the upper horizontal arm 5. The vertical sustaining-loop 4 receives or fits around the upper coil of the wire support and assists very materially in strengthening said wire support at the point where it is most likely to be subject to considerable strain, because the intermediate loops or coils of the support when entwined by the plant will pull down on said upper coil, and hence this sustaining-loop is very useful and quite important. The lower horizontal arm 3 extends from one side of the coiled support toward the center thereof—as, for instance, from the left-hand side, as indicated in Fig. 2—while the upper horizontal arm 5 extends from the opposite or right-hand side of said coiled support toward the center of the same, and the inner extremities of said arms 3 5 are inserted or driven into the central stake on opposite sides thereof. I attach especial importance to this peculiar construction and arrangement of the horizontal arms and to the vertical sustaining-loop on the upper arm to receive the upper coil of the wire support, as I am thereby enabled to produce a light yet strong substantial rack, which is capable of sustaining the weight of the plant with its fruit or vegetables.

The rack is more especially designed to support a tomato-plant while it is growing and bearing or yielding; but it is obvious that it can be used with excellent results on other kinds of plants, flowers, &c.

To use the device, the stake, which is sharpened or pointed at its lower extremity, is inserted in the ground near the plant, and the latter is then inserted into the coiled support around and over the lower horizontal arm, which furnishes a steady support for the plant while growing, and the branches thereof trained and entwined around the wire support.

I have found that by the use of a rack constructed in accordance with my invention a tomato-plant requires less room or space, the plant grows to a larger size and is more healthy and thrifty, and the yield therefrom is larger than can be secured by the common method of supporting the plant by a forked stake.

The rack is very simple, strong, and durable in construction, cheap of manufacture, reliable and efficient in service, can be easily adjusted, and can be removed and used any number of times.

Having thus fully described my invention, what I claim as new, and desire to secure by Letters Patent, is—

1. A rack for growing plants, comprising a central supporting-stake and a spiral or coiled support bent from a single piece of wire, the ends of the lower and upper coils of said wire being bent inwardly toward the stake to form horizontal arms which are inserted or forced into opposite sides of the stake, substantially as described, for the purpose set forth.

2. A rack for growing plants, comprising a central vertical stake, and a coiled or wire support which encircles the stake, the upper coil of said wire support being sustained by a vertical loop which fits around said coil, said loop being formed on a horizontal arm attached to the stake, substantially as described.

3. A rack for growing plants, comprising a central vertical stake and a coiled or spiral support formed of a single piece of wire, the upper and lower coils of said support being bent in opposite directions toward the center of the spiral support to form two horizontal arms which are attached to opposite sides of the central stake, the upper horizontal arm being further bent at its junction with the upper coil to form a vertical sustaining-loop which receives said upper coil of the support, substantially as described.

In testimony whereof I affix my signature in presence of two witnesses.

JAMES RICHARDS.

Witnesses:
NOAH ZIM,
DANIEL CHILDERS.